Jan. 22, 1924.
J. B. FECHT
PISTON RING
Filed Nov. 25, 1919
1,481,701
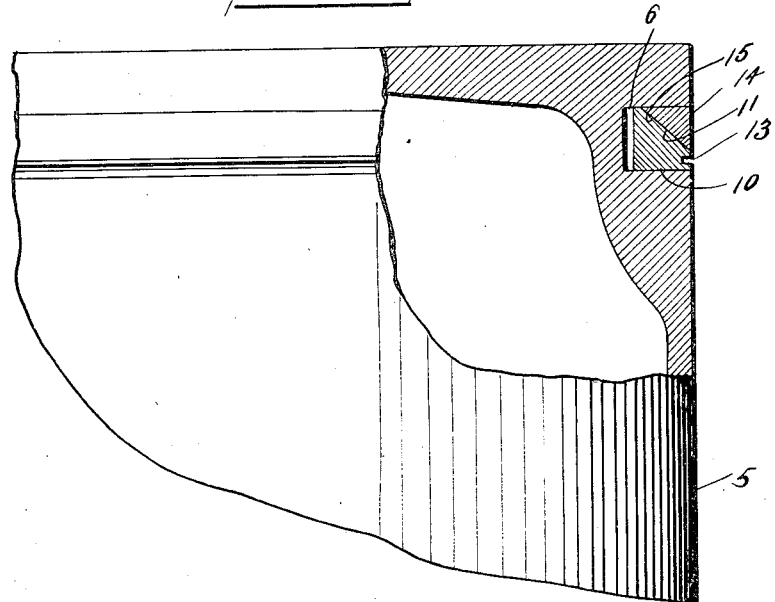
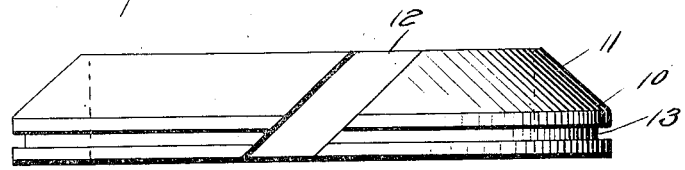
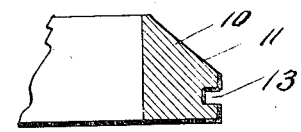
Inventor
J. B. Fecht.

Patented Jan. 22, 1924.

1,481,701

UNITED STATES PATENT OFFICE.

JOHN B. FECHT, OF ROCKWELL CITY, IOWA.

PISTON RING.

Application filed November 25, 1919. Serial No. 340,646.

*To all whom it may concern:*

Be it known that I, JOHN B. FECHT, a citizen of the United States, residing at Rockwell City, in the county of Calhoun and State of Iowa, have invented certain new and useful Improvements in Piston Rings; and I do hereby declare the following to be a full, clear, and exact description of the invention, such as will enable others skilled in the art to which it appertains to make and use the same.

The present invention relates to piston rings, its principal object being to provide a piston ring which will reduce the leakage about the piston and cylinder wall to a minimum and which will prevent lubricating oil from passing above the piston.

A further object of the invention is to provide a piston ring particularly adapted to internal combustion engine pistons and which will prevent excessive deposits of lubricant from adhering to the interior of the cylinder, and will provide a tight joint between the piston and wall and yet is so constructed as to reduce the wear of the ring to a minimum.

It is another object of the invention to provide a piston ring which may be readily engaged in the grooves in the piston and may be conveniently disengaged therefrom.

Another object of the invention is to provide a piston ring which is simple in construction, consists of few parts, and may be manufactured and sold at a minimum cost.

With the above and other objects and advantages in mind, the invention consists in the novel combination of elements, construction and arrangements, operation and specific features all of which are hereinafter enlarged upon and recited in the subjoined claims, the invention being illustrated in the accompanying drawings wherein:

Figure 1 is an elevation of a piston equipped with my improved piston ring having parts broken away, the piston ring appearing in transverse cross section.

Figure 2 is an edge view of the inner ring;

Figure 3 is a like view of the outer ring; and

Figure 4 is a fragmentary view partly in elevation and partly in section of the piston ring sections about to be assembled for mounting the same on the piston.

Referring to the drawing in detail wherein like characters of reference designate like parts in the several views, the numeral 5 designates the usual internal combustion engine piston provided with the usual circumferential groove 6 for receiving the packing or piston ring.

My improved piston ring comprises an inner expansible ring section 10 which is beveled upon its outer peripheral face adjacent one edge of the ring to its inner peripheral face. This inner ring is split transversely and diagonally as indicated at 12.

The outer peripheral base of the ring section 10 is formed with a circumferential lubricant receiving groove 13 below the beveled face 11 which lubricates the inner face of the cylinder during the reciprocation of the piston.

For cooperation with the expansible ring there is provided an adjustable ring 14 which has its inner face beveled as indicated at 15 to coincide with the beveled face of the ring 10. When these two rings are assembled they form a ring rectangular in cross section as illustrated in Figure 1.

In view of the fact that the inner ring is expansible and the outer ring contractible they will effectively seal the space between the piston and walls upon the explosive stroke of the engine and upon the exhaust of the same the ring will be contracted slightly in the groove in the piston thereby reducing the friction between the ring and cylinder.

During the suction or downstroke of the engine the lower beveled edge of the contractile ring 14 contacts with the inner face of the cylinder and scrapes or evenly distributes the lubricant on the same and forces some of the oil or lubricant to the oil or lubricant groove in the expansible ring.

The structure illustrated and described is a practical embodiment of the invention but it will be stated that the same may be modified in many respects, and that my limits of such modification are only governed by what is claimed.

What is claimed as new is:

1. A piston ring having a plurality of coacting sections, one of said sections being expansible, the other section being contractile and said sections having contacting inclined walls extending upwardly and inwardly toward the top of the piston whereby the ring will contract on exhaust strokes of the piston to reduce friction between the ring and the cylinder wall.

2. A piston ring having a section provided with an oil groove in its periphery and a wall inclining from said periphery and away from the groove and toward the top of the piston, and a section substantially triangular in cross section to provide a feather edge to scrape the cylinder wall adjacent said groove, one wall of the second mentioned section contacting with the said wall of the first mentioned section and being inclined substantially similarly thereto, the first mentioned section being expansible and the second mentioned section being contractile whereby the ring will contract on exhaust strokes of the piston to reduce friction between the ring and the cylinder wall.

3. The combination, with a piston having a substantially rectangular annular groove opening to its outer side and a cylinder in which said piston operates, of packing in said groove comprising a split ring wedge shape in cross section and having its lesser thickness at its outer edge and tensioned to spring outwardly of the groove, and another split ring in said groove reversely wedge shape in cross section seated between one wall of the groove and the inclined face of said other ring and tensioned to spring inwardly and to press the latter against the opposite wall of the groove.

4. The combination, with a piston having a substantially rectangular annular groove opening to its outer periphery and a cylinder in which said piston operates, of packing in said groove comprising two substantially concentric split rings, one of which is tensioned to expand and bears at its outer periphery against the wall of the cylinder and is wedge shape in cross section with less thickness at its outer than at its inner periphery, and the other of which rings is tensioned to contract and is of less width than, and is wedge shape in cross section the reverse of, the first-mentioned ring, the contacting faces of said rings being inclined to their axis whereby said rings are pressed against opposite walls of said groove.

In testimony whereof I affix my signature in presence of two witnesses.

JOHN B. FECHT.

Witnesses:
G. RICKELS,
R. W. SOMMERFELD.